(12) United States Patent
Mathason et al.

(10) Patent No.: US 12,608,064 B2
(45) Date of Patent: Apr. 21, 2026

(54) METHODS AND APPARATUS TO MONITOR A POWER SUPPLY

(71) Applicant: Intelligent Platforms, LLC, Charlottesville, VA (US)

(72) Inventors: Alan Paul Mathason, Robesonia, PA (US); Darrell James Hatfield, II, Faber, VA (US); Peter Thomas Betker, Crozet, VA (US)

(73) Assignee: Intelligent Platforms, LLC, Charlottesville, VA (US)

( * ) Notice: Subject to any disclaimer, the term of this patent is extended or adjusted under 35 U.S.C. 154(b) by 78 days.

(21) Appl. No.: 18/584,461

(22) Filed: Feb. 22, 2024

(65) Prior Publication Data

US 2025/0271917 A1      Aug. 28, 2025

(51) Int. Cl.
  *G06F 1/28*          (2006.01)
  *G06F 1/26*          (2006.01)
(52) U.S. Cl.
  CPC .............. *G06F 1/28* (2013.01); *G06F 1/263* (2013.01)
(58) Field of Classification Search
  CPC ................................. G06F 1/28; G06F 1/263
  See application file for complete search history.

(56) References Cited

U.S. PATENT DOCUMENTS

| 7,209,838 | B1 * | 4/2007 | Wright ............... G01R 19/2513 |
| | | | 700/297 |
| 9,032,522 | B1 * | 5/2015 | Mulder ................ G06F 21/552 |
| | | | 726/23 |

| 10,142,117 | B2 * | 11/2018 | Pelissier ................. H04L 12/10 |
| 10,582,016 | B2 * | 3/2020 | Dhanawade ...... H04L 12/40169 |
| 2005/0289489 | A1 * | 12/2005 | Kim ....................... G01K 13/00 |
| | | | 702/182 |
| 2014/0111898 | A1 * | 4/2014 | Williams ................ H02H 1/06 |
| | | | 361/87 |
| 2018/0292801 | A1 | 10/2018 | Tonet |
| 2019/0326780 | A1 * | 10/2019 | Zeighami ............... H02J 13/00 |
| 2019/0391628 | A1 * | 12/2019 | Camiolo ............ H02J 7/00712 |
| 2020/0393801 | A1 * | 12/2020 | Wade ................... G05B 19/054 |
| 2021/0026430 | A1 * | 1/2021 | Nakamura ............. G06F 1/324 |
| 2021/0311536 | A1 * | 10/2021 | Messick ................... G06F 1/28 |
| 2022/0121260 | A1 * | 4/2022 | King ...................... H02J 3/381 |

(Continued)

FOREIGN PATENT DOCUMENTS

| KR | 20100101968 A | 9/2010 |
| KR | 20140003083 A | 1/2014 |
| KR | 101778335 B1 | 9/2017 |

OTHER PUBLICATIONS

European Patent Office, "Extended European Search Report," issued in connection with European Patent Application No. 25159146.7, dated Jul. 27, 2025, 11 pages.

*Primary Examiner* — Aurel Prifti
(74) *Attorney, Agent, or Firm* — Hanley, Flight & Zimmerman, LLC

(57)          ABSTRACT

Methods and apparatus to monitor a power supply are disclosed. An example apparatus includes a first power supply included in a programmable logic controller (PLC), the first power supply to receive input power from a second power supply external to the PLC, and analytics circuitry included in the first power supply, the analytics circuitry to determine, based on the input power, a diagnostic parameter associated with the second power supply.

18 Claims, 8 Drawing Sheets

(56)             References Cited

U.S. PATENT DOCUMENTS

2022/0328273 A1*  10/2022  Vaghasiya ......... H02J 13/00004
2023/0071427 A1*   3/2023  Fluhr ................... G06F 1/3206
2024/0142534 A1*   5/2024  Ropel ...................... B60L 3/12
2024/0144747 A1*   5/2024  Ropel ...................... B60L 3/12

* cited by examiner

500

START

502 MONITOR INPUT POWER FROM EXTERNAL POWER SUPPLY

504 MONITOR INTERNAL POWER OF SECONDARY POWER SUPPLY

506 DETERMINE FIRST PARAMETER(S) ASSOCIATED WITH EXTERNAL POWER SUPPLY

508 DETERMINE SECOND PARAMETER(S) ASSOCIATED WITH SECONDARY POWER SUPPLY

510 TRANSMIT PARAMETER(S) TO FPGA CIRCUITRY

512 CONTINUE MONITORING?

YES

NO

END

METHODS AND APPARATUS TO MONITOR A POWER SUPPLY

FIELD OF THE DISCLOSURE

This disclosure relates generally to process control systems and, more particularly, to methods and apparatus to monitor a power supply.

BACKGROUND

Process control systems, like those used in chemical processing, petroleum processing or other processes, typically include one or more process controllers that may be communicatively coupled to one or more field devices via analog, digital or combined analog/digital buses. Such processor controllers are commonly implemented using one or more programmable logic controllers (PLCs). The PLCs can receive signals indicative of process measurements and then process this information to generate control signals, implement control routines, and/or make other process control decisions. Some PLCs are electrically coupled to an external power supply to receive power therefrom.

SUMMARY

An example apparatus disclosed herein includes a first power supply included in a programmable logic controller (PLC). The first power supply is to receive input power from a second power supply external to the PLC. The apparatus further includes analytics circuitry included in the first power supply. The analytics circuitry is to determine, based on the input power, a diagnostic parameter associated with the second power supply.

An example apparatus disclosed herein includes memory, instructions, and programmable circuitry in a first power supply of a programmable logic controller (PLC). The programmable circuitry is to execute the instructions to at least monitor internal power of the first power supply, and monitor input power from a second power supply, the second power supply external to the PLC, the second power supply to provide the input power to the first power supply. The programmable circuitry is to execute the instructions to determine a diagnostic parameter of at least one of the first power supply or the second power supply. The programmable circuitry is to execute the instructions to transmit the diagnostic parameter to a field programmable gate array (FPGA) of the PLC.

An example non-transitory computer readable medium is disclosed herein including instructions to cause programmable circuitry to at least monitor input power from a second power supply to a first power supply, the first power supply included in a programmable logic controller (PLC), the programmable circuitry included in the first power supply, the second power supply external to the PLC. The instructions are to further cause the programmable circuitry to determine a diagnostic parameter of the second power supply based on the input power.

Figure 1:
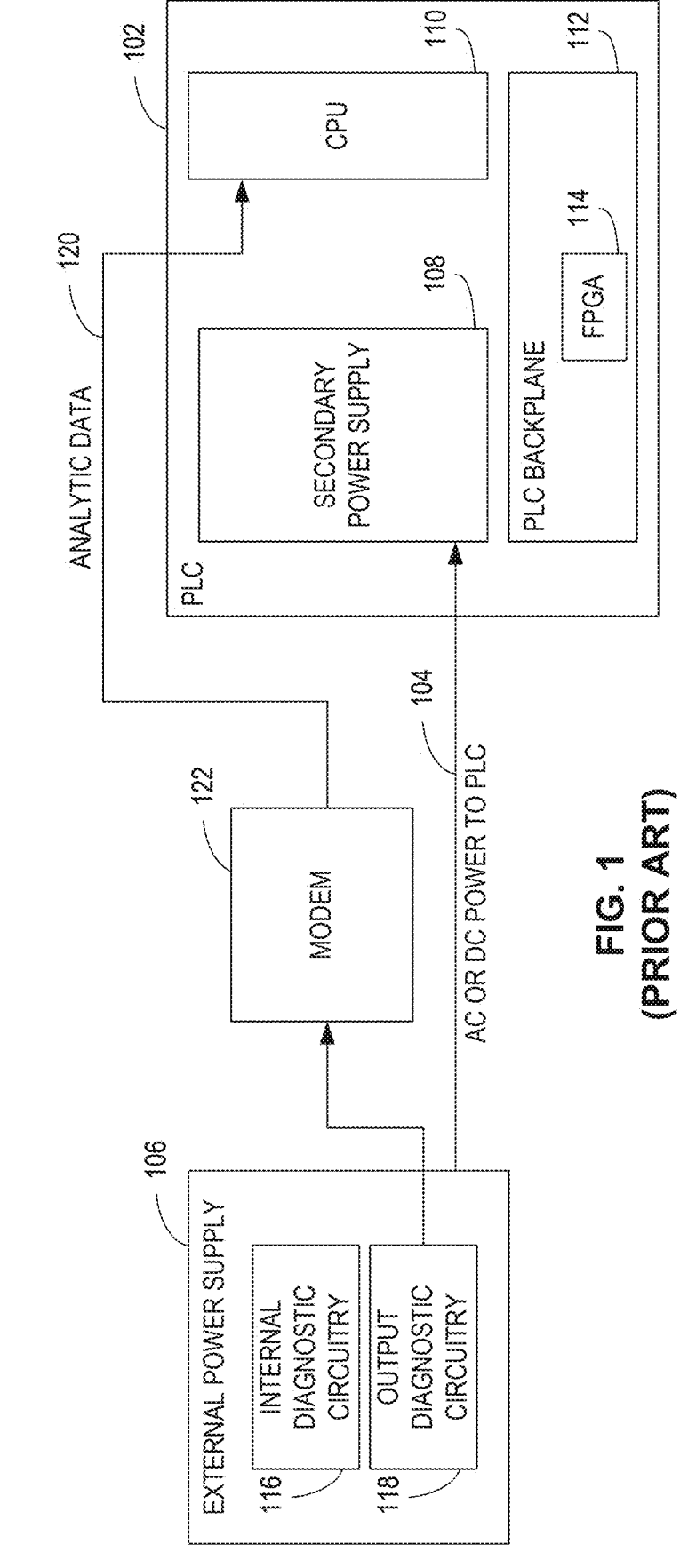
FIG. 1 illustrates a system in which a programmable logic controller (PLC) receives input power from an external power supply.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Process control system architectures have evolved over many years from systems employing primarily electromechanical devices such as relays and contactors to implement the logic of a control routine or application, to programmable logic controller (PLC) based systems. For instance, process control systems, like those used in chemical processes, petroleum processes or other processes, typically include one or more process controllers commonly implemented using PLCs. The PLCs can be communicatively and/or operatively coupled to one or more field devices via analog, digital or combined analog/digital buses. The field devices, which may include, for example, valves, valve positioners, switches and transmitters (e.g., temperature, pressure and flow rate sensors), perform functions within the process such as opening or closing valves and measuring process parameters. The PLCs receive signals indicative of process measurements made by the field devices and/or other information pertaining to the field devices, use this information to implement a control routine, and then generate control signals that are sent over the buses or other communication lines to the field devices to control the operation of the process. Information from the field devices and the PLCs may be made available to one or more applications executed by an operator workstation to enable an operator to perform desired functions with respect to the process, such as viewing the current state of the process, modifying the operation of the process, etc.

In some instances, power can be provided to one(s) of the PLCs from one or more external power supplies. External power supplies may be used to reduce line voltage transients experienced by the PLCs, reduce disruptions resulting from electrical noise, and/or isolate PLC power from power to the field devices. In some cases, performance of the external power supply may degrade over time, necessitating maintenance and/or replacement of the power supply. However, it may be difficult to predict a remaining useful life (RUL) of the power supply, where RUL refers to a length of time for which the power supply may operate before necessitating maintenance and/or replacement. For instance, the RUL of a power supply may vary based on factors such as operating temperature of the power supply, a quality of input power to the power supply, and/or a load of the power supply. Because of the difficulties in reliably predicting the RUL of a particular power supply, power supplies are commonly replaced and/or repaired at regularly scheduled and/or preset intervals. However, this may result in power supplies being replaced prematurely and/or more frequently than necessary, thus increasing part costs and/or maintenance costs. Further, some preset maintenance and/or replacement schedules may result in power supplies being replaced after a failure has already occurred, resulting in downtime and/or improper functioning of one or more devices electrically coupled to the power supplies.

In recent years, power supplies with embedded analytics have been used to facilitate planning of maintenance and/or replacement activities for power supplies electrically coupled to a process control system (e.g., a PLC). Such power supplies may include circuitry that collects and/or monitors analytic data associated with the power supply, then communicates the analytic data to the PLC. In some instances, the PLC utilizes the analytic data to predict a current state of the power supply and/or an RUL of the power supply, and presents the prediction to an operator to inform the operator when maintenance and/or replacement is to be performed. However, the sending of analytic data from the power supply to the PLC necessitates implementation of one or more external communication devices (e.g., modems, wires, a Universal Serial Bus (USB), etc.) between the power supply and the PLC, where such implementation of communication device(s) may increase part costs and/or complexity of a system.

Examples disclosed herein enable monitoring of one or more example power supplies electrically coupled to an example PLC without the use of external communication devices such as modems. In examples disclosed herein, a first example power supply (e.g., an internal power supply, a secondary power supply) is included in the PLC, and the first power supply is to receive input power from a second example power supply (e.g., an external power supply, an input power supply) external to the PLC. In some examples, example analytics circuitry is included in the first power supply, and the analytics circuitry monitors the input power from the second power supply to determine one or more example diagnostic parameters (e.g., a first load, a first input power quality, etc.) associated with the second power supply. In some examples, when the PLC and the second power supply are in a same environment and/or geographic location, the diagnostic parameters can include a first operating temperature associated with the second power supply. Additionally or alternatively, the analytics circuitry can monitor internal power of the first power supply to determine one or more second example diagnostic parameters (e.g., a second operating temperature, a second load, a second input power quality, etc.) associated with the first power supply.

In some examples, the analytics circuitry can provide the diagnostic parameter(s) to central processing unit (CPU) circuitry of the PLC via example field programmable gate array (FPGA) circuitry of the PLC. For example, example communication circuitry is implemented in the FPGA to receive example analytic data (e.g., the first diagnostic parameter(s) and/or the second diagnostic parameter(s)) from the analytics circuitry and/or to communicate the analytic data to the CPU circuitry (e.g., without the use of an external modem and/or other communication device(s)). In some examples, the CPU circuitry can access and/or obtain the analytic data from the FPGA to perform predictive analysis based on the diagnostic parameter(s). For example, the CPU circuitry can predict, based on the diagnostic parameter(s) and/or based on duration(s) associated therewith, RUL(s) of the first power supply and/or second power supply. In some examples, the CPU circuitry can output the predicted RUL(s) to an operator to facilitate maintenance and/or replacement of the first and second power supplies.

Advantageously, by monitoring diagnostic parameter(s) and/or RUL(s) of the first and second power supplies, examples disclosed herein can facilitate timing of maintenance and/or replacement activities for the first and second power supplies, thereby reducing downtime and/or costs associated therewith. Further, by including the analytics circuitry in the first power supply internal to the PLC (e.g., instead of the second power supply external to the PLC), examples disclosed herein do not communicate diagnostic information between the second power supply and the PLC. As a result, examples disclosed herein do not necessitate implementation of an external communication device (e.g., a modem, communication wires, etc.) between the second power supply and the PLC, thereby reducing part costs and/or complexity of a system implementing the PLC and the second power supply.

FIG. 1 illustrates a system 100 in which a programmable logic controller (PLC) receives input power 104 from an external power supply 106. In particular, the external power supply 106 provides the input power 104 to a secondary power supply (e.g., an internal power supply) 108 included in the PLC 102. In some instances, the external power supply 106 provides the input power 104 as alternating current (AC) or direct current (DC). In FIG. 1, the secondary power supply 108 utilizes the input power 104 to power one or more components (e.g., a central processing unit (CPU) 110, a backplane (e.g., a PLC backplane) 112, a field programmable gate array (FPGA) 114 implemented in the backplane 112, etc.) of the PLC 102. In some instances, the input power 104 can be provided to the secondary power supply 108 at a first voltage (e.g., 24 volts (V)), and the secondary power supply 108 reduces the voltage of the input power 104 prior to providing the input power 104 to the one or more components.

In FIG. 1, the external power supply 106 includes internal diagnostic circuitry 116 and output diagnostic circuitry 118 to monitor and/or determine diagnostic information associated with the external power supply 106. For instance, the internal diagnostic circuitry 116 can determine diagnostic information associated with the external power supply 106, where the diagnostic information can include operating temperature of the external power supply 106, quality of grid power provided to the external power supply 106, quality of the input power 104 output by the external power supply 106, etc. Further, the output diagnostic circuitry 118 can output and/or provide the diagnostic information associated with the external power supply 106 to the CPU 110. In particular, the output diagnostic circuitry 118 sends analytic data 120 (e.g., including the diagnostic information associated with the external power supply 106) to the CPU 110 via one or more external communication devices (e.g., a modem 122 of FIG. 1). In some instances, the modem 122 utilizes a communication protocol (e.g., Profinet, Ethernet IP, etc.) to transmit the analytic data 120 from the output diagnostic circuitry 118 to the CPU 110.

Because the internal diagnostic circuitry 116 and the output diagnostic circuitry 118 are implemented in the external power supply 106 external to the PLC 102, the internal diagnostic circuitry 116 can monitor parameter(s) of the external power supply 106 in FIG. 1, but does not monitor and/or have access to parameter(s) of the secondary power supply 108 of the PLC 102. Further, implementation of the internal diagnostic circuitry 116 and the output diagnostic circuitry 118 in the external power supply 106 necessitates the use of one or more external communication devices (e.g., the modem 122 of FIG. 1) to communicate and/or transmit diagnostic information to the PLC 102, thus increasing part costs and/or complexity of the system 100 of FIG. 1.

Figure 2:
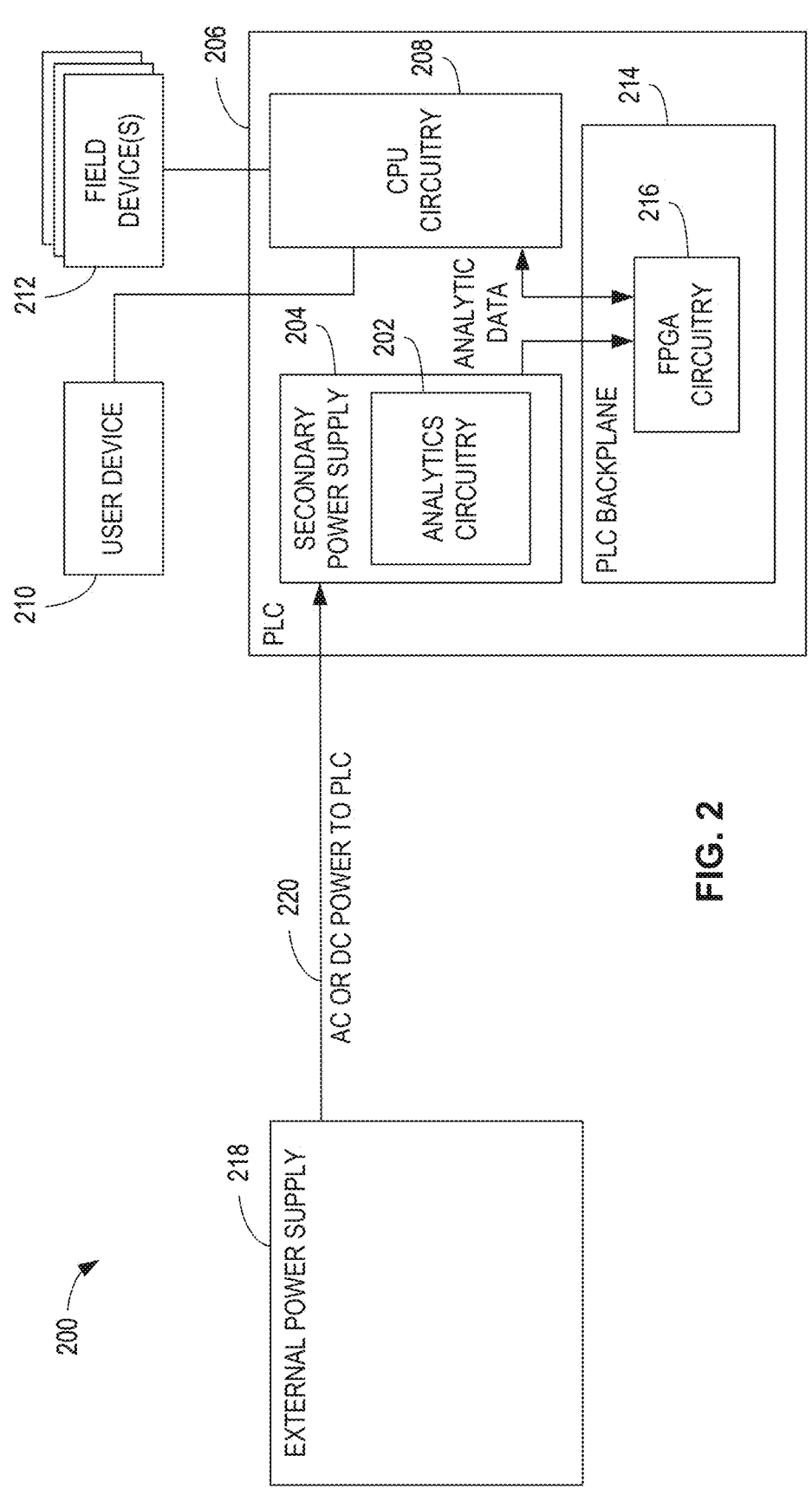
FIG. 2 illustrates an example system implementing example analytics circuitry in accordance with teachings of this disclosure.

FIG. 2 illustrates an example system (e.g., a process control system) 200 implementing example analytics circuitry 202 in accordance with teachings of this disclosure. In the illustrated example of FIG. 2, the analytics circuitry 202 is implemented (e.g., embedded) in an example secondary power supply 204 included in an example PLC 206. The PLC 206 further includes example CPU circuitry 208 communicatively and/or operatively coupled to an example user device 210 and/or to one or more example field devices 212. In some examples, the field devices 212 include one or more example valves, valve positioners, switches, transmitters, sensors (e.g., temperature sensor(s), pressure sensor(s), flow rate sensors), etc. Additionally, the PLC 206 includes an example backplane (e.g., a PLC backplane) 214 and example FPGA circuitry 216 implemented in the backplane 214.

In the illustrated example of FIG. 2, an example external power supply 218 is electrically coupled to the PLC 206 to provide power thereto. For example, the secondary power supply 204 receives example input power 220 from the external power supply 218, where the input power 220 can include AC power and/or DC power. In some examples, the secondary power supply 204 modifies (e.g., reduces) a voltage of the input power 220, and distributes the input power 220 to one or more example components (e.g., the CPU circuitry 208, the backplane 214, the FPGA circuitry 216, etc.) of the PLC 206. Additionally or alternatively, in some examples, the secondary power supply 204 can provide the input power 220 (e.g., and/or a portion thereof) to the user device 210 and/or one(s) of the field device(s) 212. In this example, unlike the external power supply 106 of FIG. 1, the example external power supply 218 of FIG. 2 does not include circuitry to monitor the external power supply 218, such that no diagnostic information is communicated between the external power supply 218 and the PLC 206. As a result, in some examples, the example system 200 of FIG. 2 does not implement communication device(s) (e.g., a modem, communication wires, etc.) between the external power supply 218 and the PLC 206.

In the illustrated example of FIG. 2, the example analytics circuitry 202 monitors and/or evaluates the input power 220 from the external power supply 218 and/or internal power of the secondary power supply 204 to determine one or more example parameters (e.g., diagnostic parameter(s)) associated with the external power supply 218 and/or the secondary power supply 204. For example, based on the input power 220, the analytics circuitry 202 can determine and/or estimate one or more first example parameters (e.g., first diagnostic parameter(s)) including at least one of a first example load of the external power supply 218, a first example quality of the input power 220, etc. In some examples, when the external power supply 218 and the PLC 206 are in a same or similar environment and/or geographic location, the first parameter(s) can include a first example operating temperature of the external power supply 218. In some examples, in addition to or instead of monitoring the external power supply 218, the analytics circuitry 202 can monitor the secondary power supply 204 of the PLC 206 based on the internal power of the secondary power supply 204. For example, based on the internal power of the secondary power supply 204, the analytics circuitry 202 can determine and/or estimate one or more second example parameters (e.g., second diagnostic parameter(s)) including at least one of a second example load of the secondary power supply 204, a second example quality of the internal power, a second example operating temperature of the secondary power supply 204, etc.

In some examples, the first parameter(s) and/or the second parameter(s) can include one or more additional parameters that may affect a remaining useful life (RUL) of the external power supply 218 and/or the secondary power supply 204. For example, the first parameter(s) and/or the second parameter(s) can further include at least one of a power factor of the external power supply 218 and/or the secondary power supply 204, electrical noise (e.g., electromagnetic noise, radio frequency (RF) noise, etc.) associated with the external power supply 218 and/or the secondary power supply 204, electromagnetic compatibility (EMC) of the external power supply 218 and/or the secondary power supply 204, etc. In some examples, the analytics circuitry 202 can access and/or obtain example sensor data from one or more example sensors implemented at the external power supply 218 and/or the PLC 206. In such examples, the analytics circuitry 202 can determine one or more additional example parameters based on the sensor data. For example, based on the sensor data, the analytics circuitry 202 can determine the additional parameter(s) corresponding to one or more example environmental characteristics associated with an environment of the external power supply 218 and/or the secondary power supply 204. In some examples, the environmental characteristic(s) can include a humidity metric, a vibration metric, a corrosivity metric (e.g., whether the power supplies 218, 204 are in a caustic and/or corrosive environment, etc.).

In the illustrated example of FIG. 2, the analytics circuitry 202 is communicatively coupled to the FPGA circuitry 216 to send and/or transmit the first parameter(s) and/or the second parameter(s) as example analytic data (e.g., diagnostic information) to the FPGA circuitry 216. For example, unlike the FPGA 114 of FIG. 1, the FPGA circuitry 216 includes circuitry that enables communication of data (e.g., the analytic data) from the analytics circuitry 202 to the FPGA circuitry 216 and/or from the FPGA circuitry 216 to the CPU circuitry 208. As a result, the example system 200 of FIG. 2 does not necessitate implementation of external communication device(s) (e.g., a modem, communication wire(s), etc.) between the analytics circuitry 202 and the CPU circuitry 208 to enable communication of data therebetween. In some examples, the FPGA circuitry 216 can also store the analytic data (and/or a portion thereof).

In the illustrated example of FIG. 2, the CPU circuitry 208 performs predictive analysis based on the analytic data stored in and/or transmitted via the FPGA circuitry 216. For example, the CPU circuitry 208 is communicatively coupled to the FPGA circuitry 216 such that CPU circuitry 208 can access and/or obtain the analytic data from the FPGA circuitry 216. In some examples, the CPU circuitry 208 predicts a first example RUL of the external power supply 218 based on the first parameter(s), and/or predicts a second example RUL of the secondary power supply 204 based on the second parameter(s). In some examples, the first RUL represents a first predicted duration for which the external power supply 218 can operate before necessitating repair and/or replacement of the external power supply 218, and the second RUL represents a second predicted duration for which the secondary power supply 204 can operate before necessitating repair and/or replacement of the secondary power supply 204. In some examples, the CPU circuitry 208 predicts the first RUL and/or the second RUL by comparing the first parameter(s) and/or the second parameter(s) to one or more example thresholds. In some examples, the threshold(s) can be selected based on historical data associated with the external power supply 218, the secondary power supply 204, and/or one or more additional power supplies previously implemented in the system 200 of FIG. 2 and/or in one or more other systems.

In some examples, the CPU circuitry 208 determines durations associated with one(s) of the first parameter(s) and/or the second parameter(s), and compares the durations to the threshold(s) to determine the predicted RUL(s). For example, the CPU circuitry 208 can determine the predicted RUL(s) based on the operating temperature(s) of the external power supply 218 and/or the secondary power supply 204 and the associated duration(s). In one example, the CPU circuitry 208 selects a first threshold (e.g., a first duration threshold) corresponding to a first example operating temperature of the external power supply 218. In some such examples, the CPU circuitry 208 predicts the first RUL of the external power supply 218 is at a first example value when the external power supply 218 operates at the first operating temperature for a first example duration less than the first threshold, and the CPU circuitry 208 can predict the first RUL of the external power supply 218 is at a second example value (e.g., greater than the first value) when the external power supply 218 operates at the first operating temperature for a second example duration at or above the first threshold.

Additionally or alternatively, the CPU circuitry 208 can determine the predicted RUL(s) based on duration(s) of loads experienced by the external power supply 218 and/or the secondary power supply 204. In one example, the CPU circuitry 208 selects a second threshold corresponding to a first example load of the external power supply 218. In some such examples, the CPU circuitry 208 predicts the first RUL of the external power supply 218 is at a third example value when the external power supply 218 operates with the first load for a third example duration less than the second threshold, and the CPU circuitry 208 predicts the first RUL of the external power supply 218 is at a fourth example value (e.g., less than the third value) when the external power supply 218 operates with the first load for a fourth example duration at or above the second threshold. In some examples, different one(s) of the thresholds can be used for different operating temperatures and/or different loads. Further, different one(s) of the thresholds can be used for the external power supply 218 compared to the secondary power supply 204.

In some examples, the CPU circuitry 208 determines the first RUL and/or the second RUL by comparing and/or evaluating one(s) of the diagnostic parameters across a given duration. For example, the diagnostic parameter(s) evaluated at multiple points in time across the duration can be stored (e.g., in non-volatile memory), and the CPU circuitry 208 can predict reductions in life of the external power supply 218 and/or the secondary power supply 204 based on the stored diagnostic parameter(s). In some examples, the CPU circuitry 208 can integrate the reductions in life across the duration and/or across power cycles to determine a profile for respective one(s) of the external power supply 218 and/or the secondary power supply 204. In some examples, the profile(s) can be accessible to and/or tracked by the CPU circuitry 208 and/or the analytics circuitry 202. In some examples, the profile(s) can be used to predict the RUL(s) when one(s) of the power supplies 204, 218 are swapped and/or replaced.

In some examples, the CPU circuitry 208 can provide the parameter(s) as input to one or more example models and/or functions (e.g., mathematical model(s), machine learning model(s), etc.) trained to predict the RUL(s). In some examples, as a result of executing the model(s) based on the input parameter(s), the CPU circuitry 208 predicts and/or outputs the RUL(s) for the external power supply 218 and/or the secondary power supply 204.

In the illustrated example of FIG. 2, the CPU circuitry 208 can cause the user device 210 to present and/or display information obtained and/or predicted by the CPU circuitry 208 (e.g., the analytic data and/or the predicted RUL(s)). For example, the CPU circuitry 208 can cause the user device 210 to present at least one of the first RUL of the external power supply 218, the second RUL of the secondary power supply 204, or one(s) of the first parameter(s) and/or the second parameter(s) associated with the external power supply 218 and/or the secondary power supply 204. In some examples, the CPU circuitry 208 can cause the user device 210 to present an alert (e.g., a warning) to an operator to indicate when the corresponding one(s) of the external power supply 218 and/or the secondary power supply 204 is to be repaired and/or replaced. In some examples, the CPU circuitry 208 can cause the user device 210 to present the alert prior to (e.g., one day prior to, one week prior to, etc.) the external power supply 218 and/or the secondary power supply 204 necessitating repair and/or replacement. In some examples, by alerting an operator when at least one of the external power supply 218 or the secondary power supply 204 is to be repaired and/or replaced, the system 200 of FIG. 2 can reduce premature and/or delayed repair and/or replacement of the external power supply 218 and/or the secondary power supply 204.

Figure 3A:
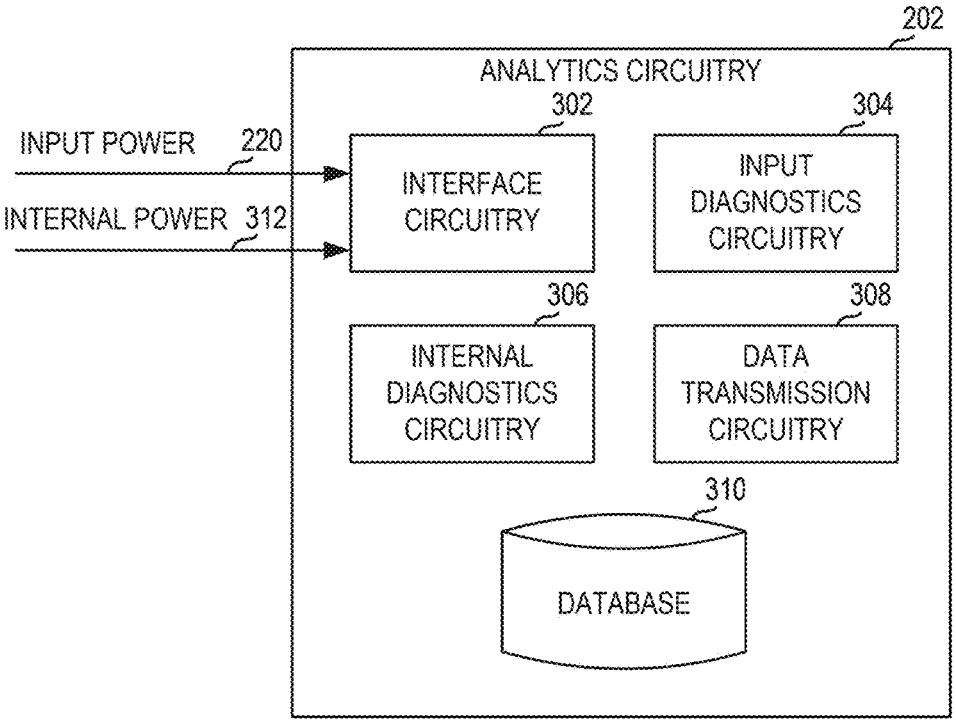
FIG. 3A is a block diagram of an example implementation of the example analytics circuitry of FIG. 2.

FIG. 3A is a block diagram of an example implementation of the example analytics circuitry 202 of FIG. 2. The analytics circuitry 202 of FIG. 3A may be instantiated (e.g., creating an instance of, bring into being for any length of time, materialize, implement, etc.) by programmable circuitry such as a Central Processor Unit (CPU) executing first instructions. Additionally or alternatively, the analytics circuitry 202 of FIG. 3A may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 3A may, thus, be instantiated at the same or different times. Some or all of the circuitry of FIG. 3A may be instantiated, for example, in one or more threads executing concurrently on hardware and/or in series on hardware. Moreover, in some examples, some or all of the circuitry of FIG. 3A may be implemented by microprocessor circuitry executing instructions and/or FPGA circuitry performing operations to implement one or more virtual machines and/or containers.

In the illustrated example of FIG. 3A, the analytics circuitry 202 includes example interface circuitry 302, example input diagnostics circuitry 304, example internal diagnostics circuitry 306, example data transmission circuitry 308, and an example database 310.

The example database 310 of FIG. 3A stores data utilized and/or obtained by the analytics circuitry 202. For example, the database 310 can store one or more example parameters (e.g., the first parameter(s) and/or the second parameter(s)) determined by the input diagnostics circuitry 304 and/or the internal diagnostics circuitry 306. The example database 310 of FIG. 3A is implemented by any memory, storage device and/or storage disc for storing data such as, for example, flash memory, magnetic media, optical media, solid state memory, hard drive(s), thumb drive(s), etc. Furthermore, the data stored in the example database 310 may be in any data format such as, for example, binary data, comma delimited data, tab delimited data, structured query language (SQL) structures, etc. While, in the illustrated example, the example database 310 is illustrated as a single device, the example database 310 and/or any other data storage devices described herein may be implemented by any number and/or type(s) of memories.

The example interface circuitry 302 of FIG. 3A accesses and/or monitors the input power 220 from the example external power supply 218 of FIG. 2 and/or the internal power of the example secondary power supply 204 of FIG. 2. For example, the interface circuitry 302 can monitor values (e.g., related to current, voltage, frequency, etc.) associated with the input power 220 and/or the internal power over time. In some examples, the interface circuitry 302 is instantiated by programmable circuitry executing interface circuitry instructions and/or configured to perform operations such as those represented by the flowchart of FIG. 5.

The example input diagnostics circuitry 304 of FIG. 3A determines one or more of the first example parameters associated with the example external power supply 218 of FIG. 2. For example, the input diagnostics circuitry 304 can determine a first example load of the external power supply 218, a first example quality of the input power 220 from the external power supply 218, a first example operating temperature of the external power supply 218, etc. Further, the input diagnostics circuitry 304 can determine and/or monitor duration(s) associated with corresponding value(s) and/or range(s) of values of the first parameter(s).

In some examples, input diagnostics circuitry 304 determines the first load of the external power supply 218 based on a voltage of the external power supply 218 and/or based on a value of current from the external power supply 218. In some examples, the input diagnostics circuitry 304 determines the first load as a proportion (e.g., a percentage) of a total available load from the external power supply 218. In some examples, the input diagnostics circuitry 304 monitors the first load over a duration (e.g., at multiple points in time across the duration), and determines an average value of the first load over the duration. In some examples, the input diagnostics circuitry 304 determines the quality of the input power 220 by monitoring example quality metrics such as interruptions in the provision of the input power 220, variations (e.g., in voltage magnitude and/or frequency) of the input power 220, transients in the input power 220, harmonic content of the input power 220, etc. In some examples, the input diagnostics circuitry 304 can determine a classification representative of the quality of the input power 220 based on a number, duration, and/or frequency of the monitored quality metric(s) (e.g., the detected interruptions, variations, transients, etc.) of the input power 220. For example, the input diagnostics circuitry 304 can evaluate the number, duration, and/or frequency of the monitored quality metric(s) based on an example lookup table to determine the classification. In some examples, when the PLC 206 of FIG. 2 is located in a same or similar environment as the external power supply 218, the input diagnostics circuitry 304 can also estimate and/or infer the first operating temperature (e.g., a first ambient temperature) of the external power supply 218 based on a measured temperature of the PLC 206. In some examples, the input diagnostics circuitry 304 is instantiated by programmable circuitry executing input diagnostics circuitry instructions and/or configured to perform operations such as those represented by the flowchart of FIG. 5.

The example internal diagnostics circuitry 306 of FIG. 3A determines one or more of the second example parameters associated with the example secondary power supply 204 of FIG. 2. For example, the internal diagnostics circuitry 306 can determine a second example load of the secondary power supply 204, a second example quality of the internal power of the secondary power supply 204, a second example operating temperature of the secondary power supply 204, etc. Further, the internal diagnostics circuitry 306 can determine and/or monitor duration(s) associated with corresponding value(s) and/or range(s) of values of the second parameter(s).

In some examples, internal diagnostics circuitry 306 determines the second load of the secondary power supply 204 based on a voltage of the secondary power supply 204 and/or based on a value of current of the internal power of the secondary power supply 204. In some examples, the internal diagnostics circuitry 306 determines the second load as a proportion (e.g., a percentage) of a total available load from the secondary power supply 204. In some examples, the internal diagnostics circuitry 306 monitors a value of the second load over a duration (e.g., at multiple points in time across the duration), and determines an average value of the second load over the duration. In some examples, the internal diagnostics circuitry 306 determines the quality of the internal power by monitoring example quality metrics such as interruptions in the provision of the internal power to one or more components of the PLC 206 of FIG. 2, variations (e.g., in voltage magnitude and/or frequency) of the internal power, transients in the internal power, harmonic content of the internal power, etc. In some examples, the internal diagnostics circuitry 306 can determine a classification representative of the quality of the internal power based on a number, duration, and/or frequency associated with the monitored quality metric(s) (e.g., the detected interruptions, variations, transients, etc.) of the internal power. For example, the internal diagnostics circuitry 306 can evaluate the number, duration, and/or frequency of the monitored quality metric(s) based on an example lookup table to determine the classification. In some examples, the input diagnostics circuitry 304 can also estimate the second operating temperature (e.g., a second ambient temperature) of the secondary power supply 204 based on measurement data one or more temperature sensors implemented in the PLC 206 and communicatively coupled to the analytics circuitry 202. In some examples, the internal diagnostics circuitry 306 is instantiated by programmable circuitry executing internal diagnostics circuitry instructions and/or configured to perform operations such as those represented by the flowchart of FIG. 5.

The example data transmission circuitry 308 of FIG. 3A transmits and/or sends analytic data to the example FPGA circuitry 216 of FIG. 2. For example, the data transmission circuitry 308 is communicatively coupled to the FPGA circuitry 216 to send and/or transmit one(s) of the first parameter(s) and/or the second parameter(s) thereto. In some examples, the data transmission circuitry 308 can send and/or transmit the analytic data to the FPGA circuitry 216 without the use of external communication device(s) (e.g., modem(s), communication wire(s), etc.). In some examples, the data transmission circuitry 308 can send the analytic data to the FPGA circuitry 216 periodically and/or in response to a request from the FPGA circuitry 216. In some examples, the data transmission circuitry 308 is instantiated by programmable circuitry executing data transmission circuitry instructions and/or configured to perform operations such as those represented by the flowchart of FIG. 5.

Figure 3B:
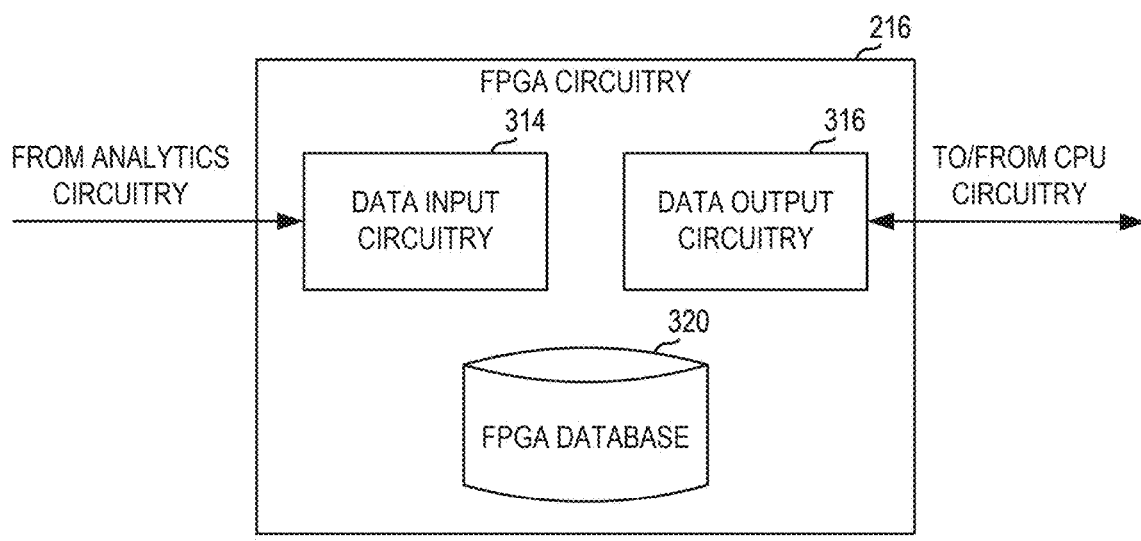
FIG. 3B is a block diagram of an example implementation of the example FPGA circuitry of FIG. 2.

FIG. 3B is a block diagram of an example implementation of the example FPGA circuitry 216 of FIG. 2. The FPGA circuitry 216 of FIG. 3B may be instantiated (e.g., creating an instance of, bring into being for any length of time, materialize, implement, etc.) by a Field Programmable Gate Array (FPGA) structured and/or configured in response to execution of second instructions to perform operations corresponding to the first instructions. It should be understood that some or all of the circuitry of FIG. 3B may, thus, be instantiated at the same or different times. Some or all of the circuitry of FIG. 3B may be instantiated, for example, in one or more threads executing concurrently on hardware and/or in series on hardware.

In the illustrated example of FIG. 3B, the FPGA circuitry 216 includes example data input circuitry 314, example data output circuitry 316, and an example FPGA database 320.

The example data input circuitry 314 of FIG. 3B obtains and/or receives example analytic data from the example analytics circuitry 202 of FIGS. 2 and/or 3A. For example, the data input circuitry 314 is communicatively coupled to the example data transmission circuitry 308 of the example analytics circuitry 202 of FIG. 3A to obtain and/or receive the analytic data therefrom. In some examples, the data input circuitry 314 can obtain and/or receive the analytic data without the use of external communication device(s) (e.g., a modem, communication wires) external to the example PLC 206 of FIG. 2. In some examples, the analytic data includes the first parameter(s) associated with the example external power supply 218 of FIG. 2 and/or the second parameter(s) associated with the example secondary power supply 204 of FIG. 2. For example, the data input circuitry 314 can obtain and/or receive the analytic data indicative of at least one of a first example load of the external power supply 218, a first example quality of the example input power 220 from the external power supply 218, a second example load of the secondary power supply 204, a second example quality of the secondary power supply 204, a second example operating temperature of the secondary power supply 204, etc. In some examples, the data input circuitry 314 provides the received one(s) of the first parameter(s) and/or the second parameter(s) to the FPGA database 320 for storage therein.

The example FPGA database 320 of FIG. 3B stores data utilized and/or obtained by the FPGA circuitry 216. For example, the FPGA database 320 can store one(s) of the example parameters (e.g., the first parameter(s) and/or the second parameter(s)) obtained and/or received from the example analytics circuitry 202 of FIGS. 2 and/or 3A. The example FPGA database 320 of FIG. 3B is implemented by static random-access memory (RAM) and/or flash memory. Furthermore, the data stored in the example FPGA database 320 may be in any data format such as, for example, binary data, comma delimited data, tab delimited data, structured query language (SQL) structures, etc. While, in the illustrated example, the example FPGA database 320 is illustrated as a single device, the example FPGA database 320 and/or any other data storage devices described herein may be implemented by any number and/or type(s) of memories.

The example data output circuitry 316 of FIG. 3B transmits and/or sends the analytic data (and/or a portion thereof) to the example CPU circuitry 208 of FIG. 2. For example, the data output circuitry 316 is communicatively coupled to the CPU circuitry 208 to transmit and/or send one(s) of the first parameter(s) and/or the second parameter(s) thereto. In some examples, the data output circuitry 316 sends the analytic data periodically to the CPU circuitry 208. Additionally or alternatively, the data output circuitry 316 can send the analytic data response to an example request received from the CPU circuitry 208 (e.g., via the data input circuitry 314 of FIG. 3B). In some examples, the data output circuitry 316 can obtain and/or receive the analytic data without the use of external communication device(s) (e.g., a modem, communication wires) external to the example PLC 206 of FIG. 2. In some examples, the sending of the analytic data to the CPU circuitry 208 enables the CPU circuitry 208 to perform predictive analysis using the analytic data (e.g., to predict a first RUL of the external power supply 218 and/or a second RUL of the secondary power supply 204 based on the first and/or second parameter(s)).

Figure 4:
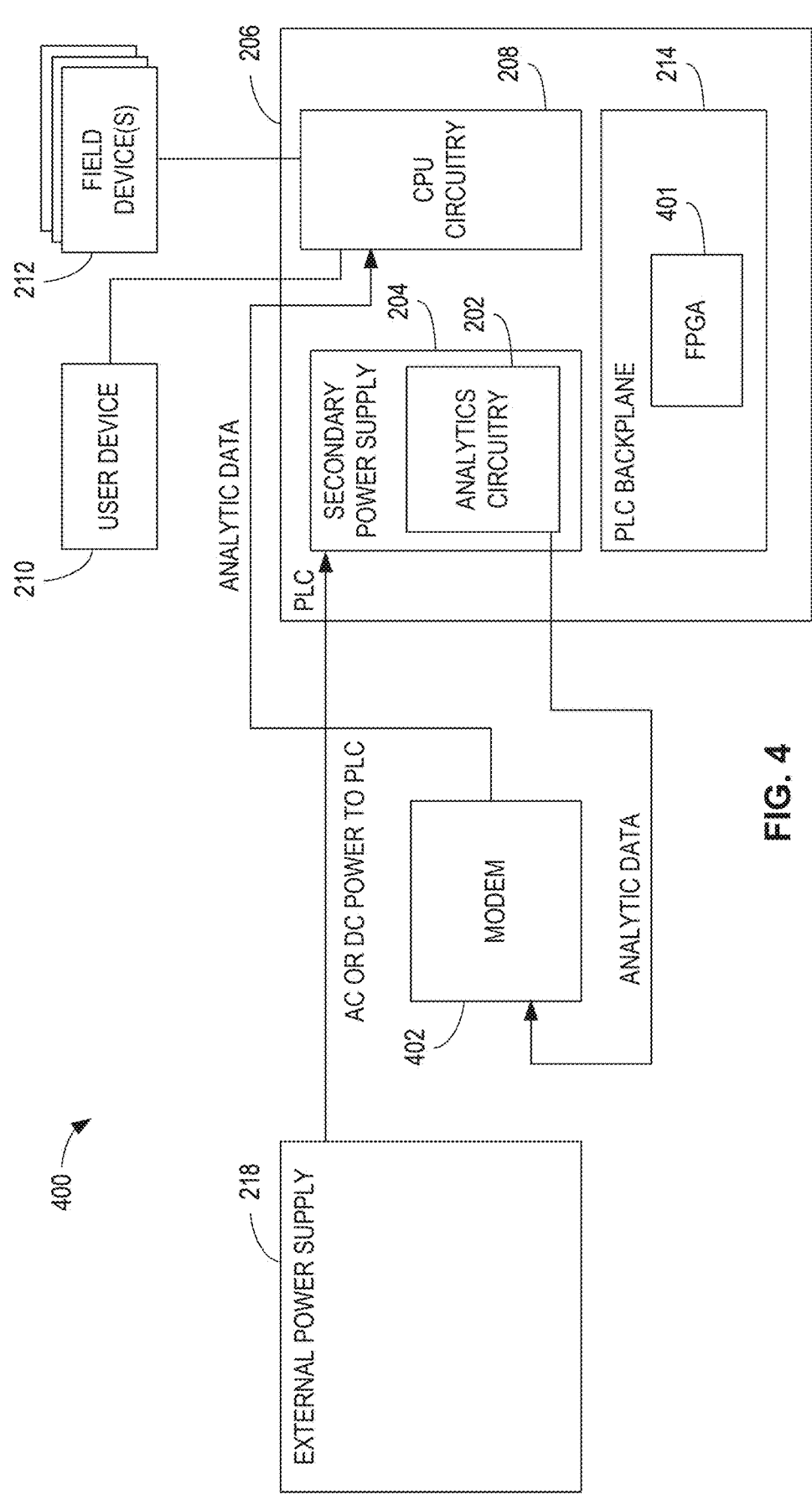
FIG. 4 illustrates a second example system implementing the example analytics circuitry of FIGS. 2 and/or 3A.

FIG. 4 illustrates a second example system (e.g., a second process control system) 400 implementing the example analytics circuitry 202 of FIGS. 2 and/or 3A. The second example system 400 of FIG. 4 is substantially similar to the example system 200 of FIG. 2, but implements an FPGA 401 in the PLC backplane 214 (e.g., instead of the example FPGA circuitry 216 of FIGS. 2 and/or 3B). In this example, the FPGA 401 of FIG. 4 does not include the example data input circuitry 314 and/or the example data output circuitry 316 of FIG. 3B and, thus, the FPGA 401 does not enable communication of analytic data between the analytics circuitry 202 and the CPU circuitry 208. Instead, the second system 200 of FIG. 4 further includes an example modem (e.g., an external modem, an external communication device) 402 communicatively coupled between the analytics circuitry 202 and the example CPU circuitry 208 of the example PLC 206. In the illustrated example of FIG. 4, because the FPGA 401 does not enable sending analytic data therethrough from the analytics circuitry 202 to the CPU circuitry 208, the analytics circuitry 202 of FIG. 4 sends and/or transmits the analytic data to the modem 402, and the modem 402 can further send and/or transmit the analytic data to the CPU circuitry 208. While the modem 402 is used in this example, one or more additional communication devices (e.g., communication wire(s), USB(s), etc.) may additionally or alternatively be used to communicate the analytic data between the analytics circuitry 202 and the CPU circuitry 208. Further, while the modem 402 is external to the PLC 206 in this example, the modem 402 may be implemented inside the PLC 206 in some examples. In some examples, implementing the example modem 402 between the analytics circuitry 202 and the CPU circuitry 208 can increase part costs and/or complexity of the second example system 400 of FIG. 4 (e.g., relative to the example system 200 of FIG. 2).

In some examples, the analytics circuitry 202 includes means for monitoring. For example, the means for monitoring may be implemented by the example interface circuitry 302. In some examples, the interface circuitry 302 may be instantiated by programmable circuitry such as the example programmable circuitry 612 of FIG. 6. For instance, the interface circuitry 302 may be instantiated by the example microprocessor 700 of FIG. 7 executing machine executable instructions such as those implemented by at least blocks

Figure 5:
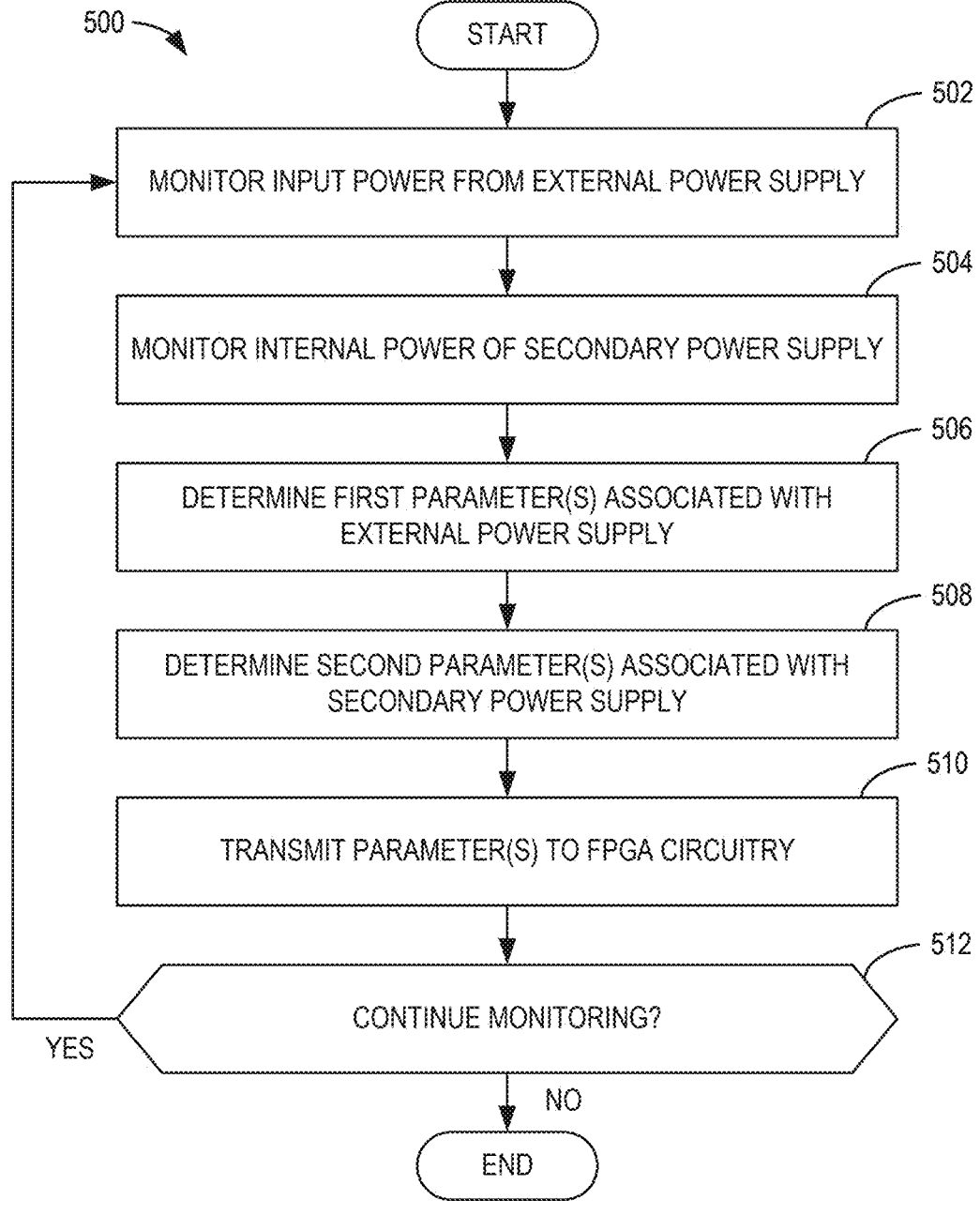
FIG. 5 is a flowchart representative of example machine readable instructions and/or example operations that may be executed, instantiated, and/or performed by example programmable circuitry to implement the example analytics circuitry 202 of FIG. 3A.

502, 504, 512 of FIG. 5. In some examples, the interface circuitry 302 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the interface circuitry 302 may be instantiated by any other combination of hardware, software, and/or firmware. For example, the interface circuitry 302 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the analytics circuitry 202 includes means for determining a first parameter. For example, the means for determining a first parameter may be implemented by the example input diagnostics circuitry 304. In some examples, the input diagnostics circuitry 304 may be instantiated by programmable circuitry such as the example programmable circuitry 612 of FIG. 6. For instance, the input diagnostics circuitry 304 may be instantiated by the example microprocessor 700 of FIG. 7 executing machine executable instructions such as those implemented by at least block 506 of FIG. 5. In some examples, the input diagnostics circuitry 304 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the input diagnostics circuitry 304 may be instantiated by any other combination of hardware, software, and/or firmware. For example, the input diagnostics circuitry 304 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the analytics circuitry 202 includes means for determining a second parameter. For example, the means for determining a second parameter may be implemented by the example internal diagnostics circuitry 306. In some examples, the internal diagnostics circuitry 306 may be instantiated by programmable circuitry such as the example programmable circuitry 612 of FIG. 6. For instance, the internal diagnostics circuitry 306 may be instantiated by the example microprocessor 700 of FIG. 7 executing machine executable instructions such as those implemented by at least block 508 of FIG. 5. In some examples, the internal diagnostics circuitry 306 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the internal diagnostics circuitry 306 may be instantiated by any other combination of hardware, software, and/or firmware. For example, the internal diagnostics circuitry 306 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the analytics circuitry 202 includes means for transmitting. For example, the means for transmitting may be implemented by the example data transmission circuitry 308. In some examples, the data transmission circuitry 308 may be instantiated by programmable circuitry such as the example programmable circuitry 612 of FIG. 6. For instance, the data transmission circuitry 308 may be instantiated by the example microprocessor 700 of FIG. 7 executing machine executable instructions such as those implemented by at least block 510 of FIG. 5. In some examples, the data transmission circuitry 308 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the data transmission circuitry 308 may be instantiated by any other combination of hardware, software, and/or firmware. For example, the data transmission circuitry 308 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the analytics circuitry 202 of FIG. 2 is illustrated in FIG. 3A, one or more of the elements, processes, and/or devices illustrated in FIG. 3A may be combined, divided, re-arranged, omitted, eliminated, and/or implemented in any other way. Further, the example interface circuitry 302, the example input diagnostics circuitry 304, the example internal diagnostics circuitry 306, the example data transmission circuitry 308, the example database 310, and/or, more generally, the example analytics circuitry 202 of FIG. 3A, may be implemented by hardware alone or by hardware in combination with software and/or firmware. Thus, for example, any of the example interface circuitry 302, the example input diagnostics circuitry 304, the example internal diagnostics circuitry 306, the example data transmission circuitry 308, the example database 310, and/or, more generally, the example analytics circuitry 202, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example analytics circuitry 202 of FIG. 3A may include one or more elements, processes, and/or devices in addition to, or instead of, those illustrated in FIG. 3A, and/or may include more than one of any or all of the illustrated elements, processes and devices.

A flowchart representative of example machine readable instructions, which may be executed by programmable circuitry to implement and/or instantiate the analytics circuitry 202 of FIG. 3A and/or representative of example operations which may be performed by programmable circuitry to implement and/or instantiate the analytics circuitry 202 of FIG. 3A, is shown in FIG. 5. The machine readable instructions may be one or more executable programs or portion(s) of one or more executable programs for execution by programmable circuitry such as the programmable circuitry 612 shown in the example programmable circuitry platform 600 discussed below in connection with FIG. 6 and/or may be one or more function(s) or portion(s) of functions to be performed by the example programmable circuitry (e.g., an FPGA) discussed below in connection with FIGS. 7 and/or 8. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIG. 5, many other methods of implementing the example analytics circuitry 202 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 5 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 5 is a flowchart representative of example machine readable instructions and/or example operations 500 that may be executed, instantiated, and/or performed by programmable circuitry to implement the example analytics circuitry 202 of FIGS. 2, 3A, and/or 4. The example machine-readable instructions and/or the example operations 500 of FIG. 5 begin at block 502, at which the example analytics circuitry 202 monitors the example input power 220 from the example external power supply 218 of FIGS. 2 and/or 4. For example, the example interface circuitry 302 of FIG. 3A accesses and/or monitors the example input power 220 sent from the external power supply 218 to the example secondary power supply 204 of FIGS. 2 and/or 4.

At block 504, the example analytics circuitry 202 monitors example internal power of the example secondary power supply 204 of FIGS. 2 and/or 4. For example, the example interface circuitry 302 accesses and/or monitors the internal power of the secondary power supply 204, where the internal power can be at a reduced voltage compared to the input power 220.

At block 506, the example analytics circuitry 202 determines one or more first example parameters associated with the example external power supply 218. For example, the example input diagnostics circuitry 304 of FIG. 3A determines, based on the input power 220, the first parameter(s) including at least one of a first load of the external power supply 218, a quality of the input power from the external power supply 218, etc. In some examples, the input diagnostics circuitry 304 further determines and/or monitors duration(s) corresponding to one(s) of the first parameter(s).

At block 508, the example analytics circuitry 202 determines one or more second example parameters associated with the example secondary power supply 204. For example, the example internal diagnostics circuitry 306 of FIG. 3A determines, based on the internal power of the secondary power supply 204, the second parameter(s) including at least one of a second load of the secondary power supply 204, a quality of the internal power, a second operating temperature of the secondary power supply 204, etc. In some examples, the internal diagnostics circuitry 306 further determines and/or monitors duration(s) corresponding to one(s) of the second parameter(s).

At block 510, the example analytics circuitry 202 transmits the parameter(s) to the example FPGA circuitry 216 of FIGS. 2, 3B, and/or 4. For example, the example data transmission circuitry 308 of FIG. 3A sends and/or transmits one(s) of the first parameter(s) and/or the second parameter(s) to the FPGA circuitry 216 for storage therein and/or for access by the example CPU circuitry 208 of FIGS. 2 and/or 4. In some examples, the data transmission circuitry 308 sends and/or transmits the parameter(s) to the FPGA circuitry 216 with the use of a modem and/or other external communication device(s). In some examples, by providing the parameter(s) to the FPGA circuitry 216 to be accessed by the CPU circuitry 208, the data transmission circuitry 308 enables the CPU circuitry 208 to predict RUL(s) for the external power supply 218 and/or the secondary power supply 204 to facilitate repair and/or replacement thereof.

At block 512, the example analytics circuitry 202 determines whether to continue monitoring. For example, the example interface circuitry 302 determines to continue monitoring while the input power 220 is received from the external power supply 218. In response to the interface circuitry 302 determining to continue monitoring (e.g., block 512 returns a result of YES), control returns to block 502. Alternatively, in response to the interface circuitry 302 determining not to continue monitoring (e.g., block 512 returns a result of NO), control ends.

Figure 6:
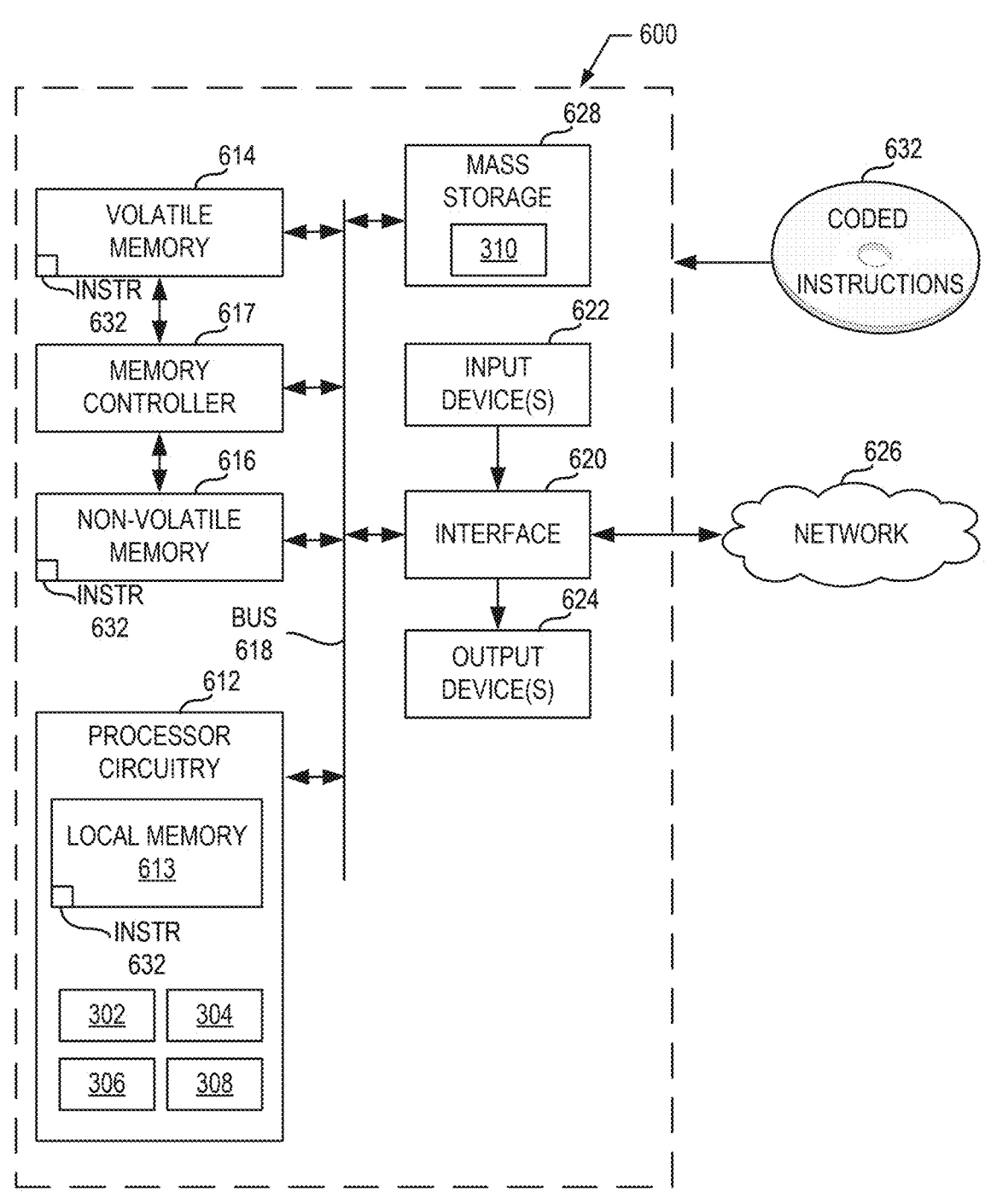
FIG. 6 is a block diagram of an example processing platform including programmable circuitry structured to execute, instantiate, and/or perform the example machine readable instructions and/or perform the example operations of FIG. 5 to implement the example analytics circuitry 202 of FIG. 3A.

FIG. 6 is a block diagram of an example programmable circuitry platform 600 structured to execute and/or instantiate the example machine-readable instructions and/or the example operations of FIG. 5 to implement the analytics circuitry 202 of FIG. 3A. The programmable circuitry platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 600 of the illustrated example includes programmable circuitry 612. The programmable circuitry 612 of the illustrated example is hardware. For example, the programmable circuitry 612 can be implemented by one or more integrated circuits, logic circuits, FPGAs, microprocessors, CPUs, GPUs, DSPs, and/or microcontrollers from any desired family or manufacturer. The programmable circuitry 612 may be implemented by one or more semiconductor based (e.g., silicon based) devices. In this example, the programmable circuitry 612 implements the example interface circuitry 302, the example input diagnostics circuitry 304, the example internal diagnostics circuitry 306, and the example data transmission circuitry 308.

The programmable circuitry 612 of the illustrated example includes a local memory 613 (e.g., a cache, registers, etc.). The programmable circuitry 612 of the illustrated example is in communication with main memory 614, 616, which includes a volatile memory 614 and a non-volatile memory 616, by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617. In some examples, the memory controller 617 may be implemented by one or more integrated circuits, logic circuits, microcontrollers from any desired family or manufacturer, or any other type of circuitry to manage the flow of data going to and from the main memory 614, 616.

The programmable circuitry platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 620. The input device(s) 622 permit(s) a user (e.g., a human user, a machine user, etc.) to enter data and/or commands into the programmable circuitry 612. The input device(s) 622 can be implemented by, for example, an audio sensor, a microphone, a camera (still or video), a keyboard, a button, a mouse, a touchscreen, a trackpad, a trackball, an isopoint device, and/or a voice recognition system.

One or more output devices 624 are also connected to the interface circuitry 620 of the illustrated example. The output device(s) 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 600 of the illustrated example also includes one or more mass storage discs or devices 628 to store firmware, software, and/or data. Examples of such mass storage discs or devices 628 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 632, which may be implemented by the machine readable instructions of FIG. 5, may be stored in the mass storage device 628, in the volatile memory 614, in the non-volatile memory 616, and/or on at least one non-transitory computer readable storage medium such as a CD or DVD which may be removable.

Figure 7:
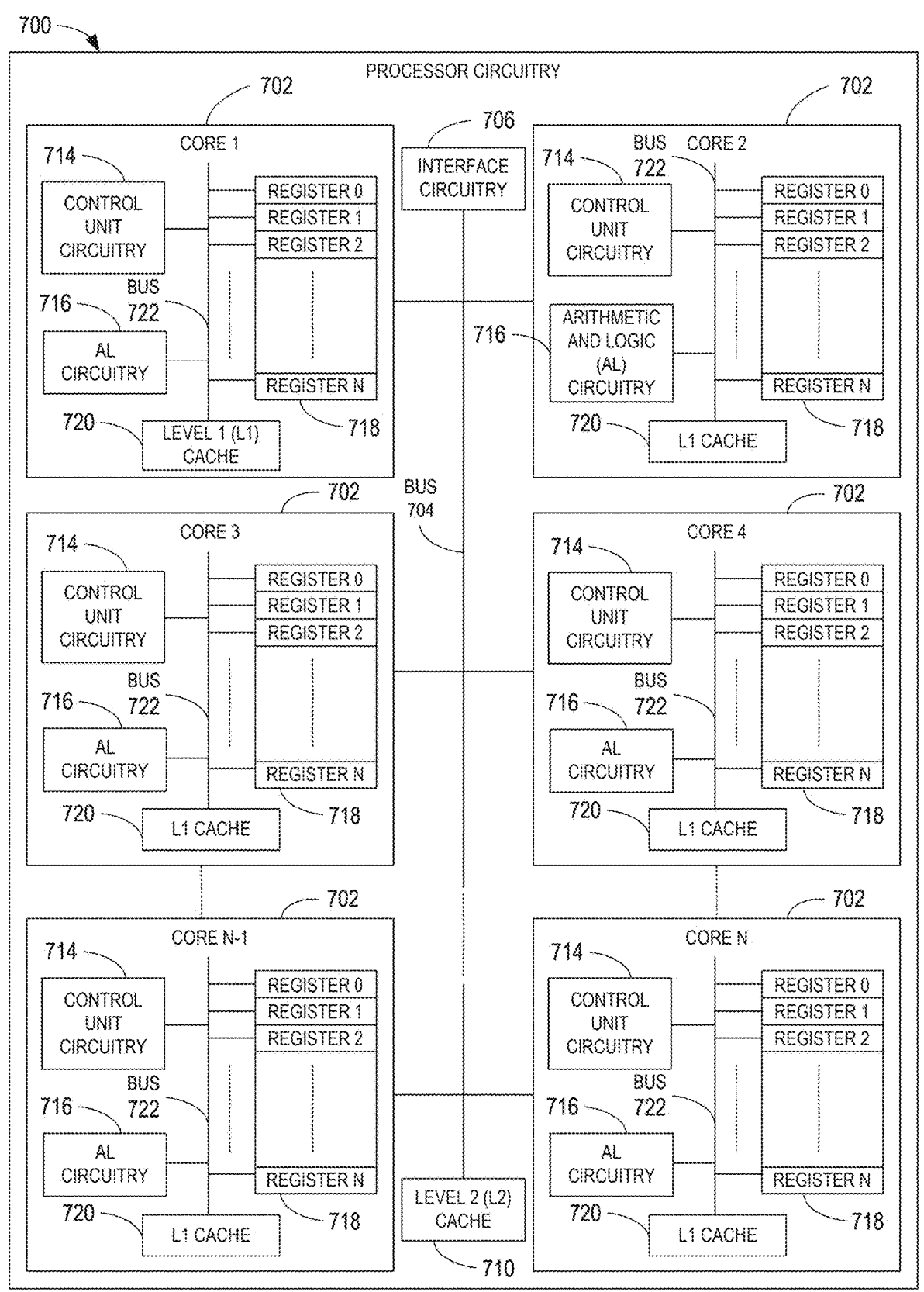
FIG. 7 is a block diagram of an example implementation of the programmable circuitry of FIG. 6.

FIG. 7 is a block diagram of an example implementation of the programmable circuitry 612 of FIG. 6. In this example, the programmable circuitry 612 of FIG. 6 is implemented by a microprocessor 700. For example, the microprocessor 700 may be a general-purpose microprocessor (e.g., general-purpose microprocessor circuitry). The microprocessor 700 executes some or all of the machine-readable instructions of the flowchart of FIG. 5 to effectively instantiate the circuitry of FIG. 2 as logic circuits to perform operations corresponding to those machine readable instructions. In some such examples, the circuitry of FIG. 3A is instantiated by the hardware circuits of the microprocessor 700 in combination with the machine-readable instructions. For example, the microprocessor 700 may be implemented by multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine readable instructions and/or operations represented by the flowchart of FIG. 5.

The cores 702 may communicate by a first example bus 704. In some examples, the first bus 704 may be implemented by a communication bus to effectuate communication associated with one(s) of the cores 702. For example, the first bus 704 may be implemented by at least one of an Inter-Integrated Circuit (I2C) bus, a Serial Peripheral Interface (SPI) bus, a PCI bus, or a PCIe bus. Additionally or alternatively, the first bus 704 may be implemented by any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2 cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry (sometimes referred to as an ALU) 716, a plurality of registers 718, the local memory 720, and a second example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating-point operations. In yet other examples, the AL circuitry 716 may include first AL circuitry that performs integer-based operations and second AL circuitry that performs floating-point operations. In some examples, the AL circuitry 716 may be referred to as an Arithmetic Logic Unit (ALU).

The registers 718 are semiconductor-based structures to store data and/or instructions such as results of one or more of the operations performed by the AL circuitry 716 of the corresponding core 702. For example, the registers 718 may include vector register(s), SIMD register(s), general-purpose register(s), flag register(s), segment register(s), machine-specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure, such as by being distributed throughout the core 702 to shorten access time. The second bus 722 may be implemented by at least one of an I2C bus, a SPI bus, a PCI bus, or a PCIe bus.

Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages.

The microprocessor 700 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 700, in the same chip package as the microprocessor 700 and/or in one or more separate packages from the microprocessor 700.

Figure 8:
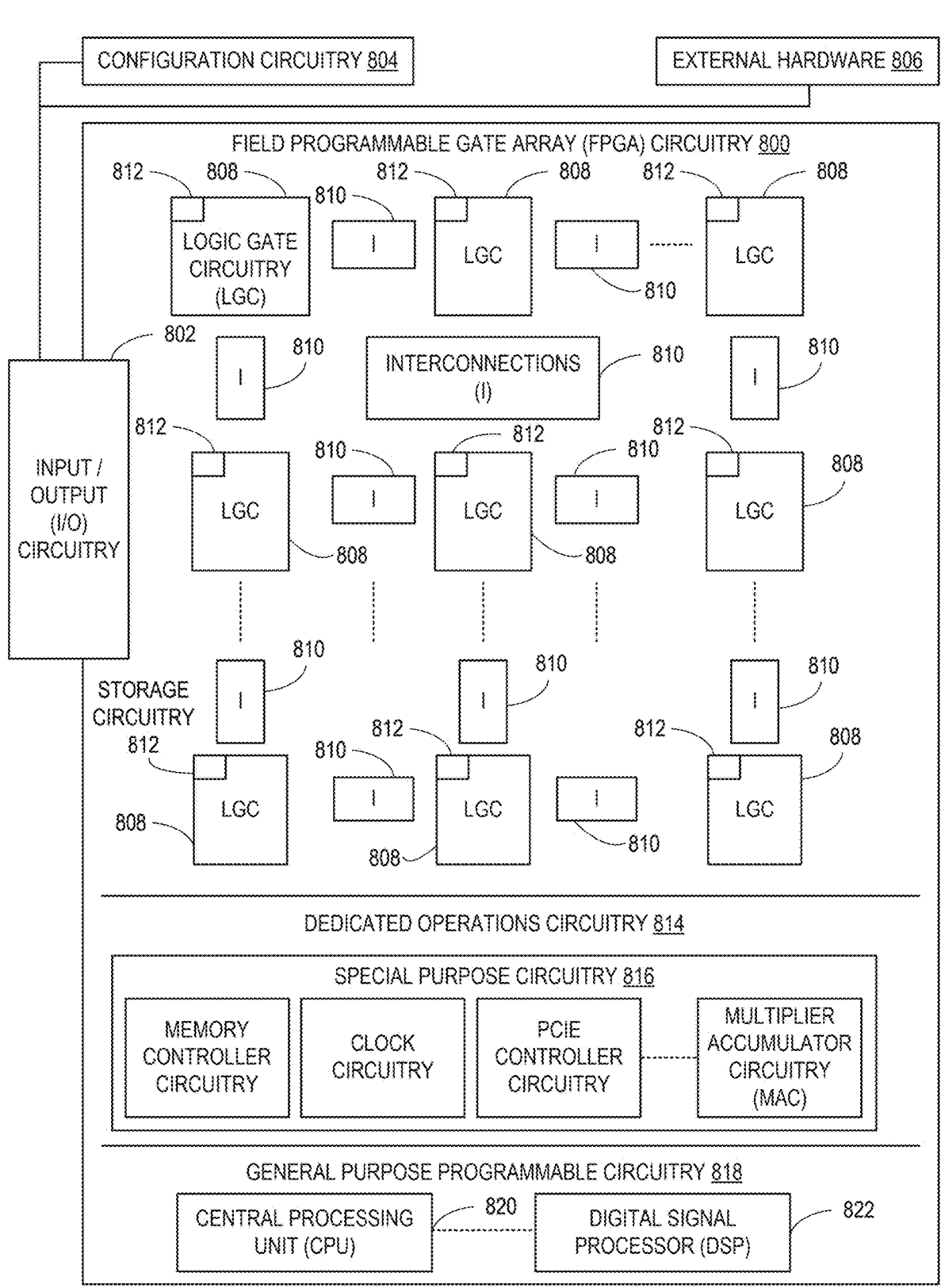
FIG. 8 is a block diagram of another example implementation of the programmable circuitry of FIG. 6.

FIG. 8 is a block diagram of another example implementation of the programmable circuitry 612 of FIG. 6. In this example, the programmable circuitry 612 is implemented by FPGA circuitry 800. For example, the FPGA circuitry 800 may be implemented by an FPGA. The FPGA circuitry 800 can be used, for example, to perform operations that could otherwise be performed by the example microprocessor 700 of FIG. 7 executing corresponding machine readable instructions. However, once configured, the FPGA circuitry 800 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 700 of FIG. 7 described above (which is a general purpose device that may be programmed to execute some or all of the machine readable instructions represented by the flowchart of FIG. 5 but whose interconnections and logic circuitry are fixed once fabricated), the FPGA circuitry 800 of the example of FIG. 8 includes interconnections and logic circuitry that may be configured, structured, programmed, and/or interconnected in different ways after fabrication to instantiate, for example, some or all of the operations/functions corresponding to the machine readable instructions represented by the flowchart of FIG. 5. In particular, the FPGA circuitry 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the instructions (e.g., the software and/or firmware) represented by the flowchart of FIG. 5. As such, the FPGA circuitry 800 may be configured and/or structured to effectively instantiate some or all of the operations/functions corresponding to the machine readable instructions of the flowchart of FIG. 5 as dedicated logic circuits to perform the operations/functions corresponding to those software instructions in a dedicated manner analogous to an ASIC. Therefore, the FPGA circuitry 800 may perform the operations/functions corresponding to the some or all of the machine readable instructions of FIG. 5 faster than the general-purpose microprocessor can execute the same.

In the example of FIG. 8, the FPGA circuitry 800 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 800 of FIG. 8 may access and/or load the binary file to cause the FPGA circuitry 800 of FIG. 8 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 800 of FIG. 8 to cause configuration and/or structuring of the FPGA circuitry 800 of FIG. 8, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 800 of FIG. 8 may access and/or load the binary file to cause the FPGA circuitry 800 of FIG. 8 to be configured and/or structured to perform the one or more operations/ functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 800 of FIG. 8 to cause configuration and/or structuring of the FPGA circuitry 800 of FIG. 8, or portion(s) thereof.

The FPGA circuitry 800 of FIG. 8, includes example input/output (I/O) circuitry 802 to obtain and/or output data to/from example configuration circuitry 804 and/or external hardware 806. For example, the configuration circuitry 804 may be implemented by interface circuitry that may obtain a binary file, which may be implemented by a bit stream, data, and/or machine-readable instructions, to configure the FPGA circuitry 800, or portion(s) thereof. In some such examples, the configuration circuitry 804 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 806 may be implemented by external hardware circuitry. For example, the external hardware 806 may be implemented by the microprocessor 700 of FIG. 7.

The FPGA circuitry 800 also includes an array of example logic gate circuitry 808, a plurality of example configurable interconnections 810, and example storage circuitry 812. The logic gate circuitry 808 and the configurable interconnections 810 are configurable to instantiate one or more operations/functions that may correspond to at least some of the machine readable instructions of FIG. 5 and/or other desired operations. The logic gate circuitry 808 shown in FIG. 8 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations/ functions. The logic gate circuitry 808 may include other electrical structures such as look-up tables (LUTs), registers (e.g., flip-flops or latches), multiplexers, etc.

The configurable interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example dedicated operations circuitry 814. In this example, the dedicated operations circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the programmable circuitry 612 of FIG. 6, many other approaches are contemplated. For example, FPGA circuitry may include an on-board CPU, such as one or more of the example CPU 820 of FIG. 7. Therefore, the programmable circuitry 612 of FIG. 6 may additionally be implemented by combining at least the example microprocessor 700 of FIG. 7 and the example FPGA circuitry 800 of FIG. 8. In some such hybrid examples, one or more cores 702 of FIG. 7 may execute a first portion of the machine readable instructions represented by the flowchart of FIG. 5 to perform first operation(s)/function(s), the FPGA circuitry 800 of FIG. 8 may be configured and/or structured to perform second operation(s)/function(s) corresponding to a second portion of the machine readable instructions represented by the flowchart of FIG. 5, and/or an ASIC may be configured and/or structured to perform third operation(s)/ function(s) corresponding to a third portion of the machine readable instructions represented by the flowchart of FIG. 5.

It should be understood that some or all of the circuitry of FIG. 3A may, thus, be instantiated at the same or different times. For example, same and/or different portion(s) of the microprocessor 700 of FIG. 7 may be programmed to execute portion(s) of machine-readable instructions at the same and/or different times. In some examples, same and/or different portion(s) of the FPGA circuitry 800 of FIG. 8 may be configured and/or structured to perform operations/functions corresponding to portion(s) of machine-readable instructions at the same and/or different times.

In some examples, some or all of the circuitry of FIG. 3A may be instantiated, for example, in one or more threads executing concurrently and/or in series. For example, the microprocessor 700 of FIG. 7 may execute machine readable instructions in one or more threads executing concurrently and/or in series. In some examples, the FPGA circuitry 800 of FIG. 8 may be configured and/or structured to carry out operations/functions concurrently and/or in series. Moreover, in some examples, some or all of the circuitry of FIG. 3A may be implemented within one or more virtual machines and/or containers executing on the microprocessor 700 of FIG. 7.

In some examples, the programmable circuitry 612 of FIG. 6 may be in one or more packages. For example, the microprocessor 700 of FIG. 7 and/or the FPGA circuitry 800 of FIG. 8 may be in one or more packages. In some examples, an XPU may be implemented by the programmable circuitry 612 of FIG. 6, which may be in one or more packages. For example, the XPU may include a CPU (e.g., the microprocessor 700 of FIG. 7, the CPU 820 of FIG. 8, etc.) in one package, a DSP (e.g., the DSP 822 of FIG. 8) in another package, a GPU in yet another package, and an FPGA (e.g., the FPGA circuitry 800 of FIG. 8) in still yet another package.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that monitor performance of one or more example power supplies. Examples disclosed herein implement example analytics circuitry in an example secondary power supply included in an example PLC, where the secondary power supply receives example input power from an example external power supply external to the PLC. In some examples, the analytics circuitry monitors and/or determines, based on the input power from the external power supply and/or internal power of the secondary power supply, one or more example parameters (e.g., load, operating temperature, power quality, etc.) associated with the external power supply and/or the secondary power supply. Further, the example analytics circuitry can transmit, via example FPGA circuitry of the PLC, diagnostic information (e.g., the parameter(s)) to example CPU circuitry of the PLC for use in predicting RUL(s) of the external power supply and/or the secondary power supply. By enabling prediction of the RULs, examples disclosed herein can facilitate scheduling of maintenance activities (e.g., repair and/or replacement) of the external power supply and/or the secondary power supply. Accordingly, disclosed systems, apparatus, articles of manufacture, and methods improve the efficiency of using a computing device by reducing a risk of premature and/or delayed repair and/or replacement of power supplies, thereby reducing downtime of the power supplies and/or one or more field devices electrically coupled thereto. Further, by enabling communication of diagnostic information between the secondary power supply and the CPU circuitry via the FPGA circuitry, examples disclosed herein do not necessitate the use of external communication device(s) (e.g., a modem, communication wire(s), etc.), thereby reducing part costs and/or complexity of a system (e.g., a process control system). Additionally, implementation of the analytics circuitry in the secondary power supply of the PLC (e.g., instead of in the external power supply) can provide a more accurate representation of input voltages received at the PLC by accounting for the effects of transmission loss between the secondary power supply and the external power supply.

Disclosed systems, apparatus, articles of manufacture, and methods are accordingly directed to one or more improvement(s) in the operation of a machine such as a computer or other electronic and/or mechanical device.

Example methods, apparatus, systems, and articles of manufacture to monitor a power supply are disclosed herein. Further examples and combinations thereof include the following:

Example 1 includes an apparatus comprising a first power supply included in a programmable logic controller (PLC), the first power supply to receive input power from a second power supply external to the PLC, and analytics circuitry included in the first power supply, the analytics circuitry to determine, based on the input power, a diagnostic parameter associated with the second power supply.

Example 2 includes the apparatus of example 1, wherein the diagnostic parameter includes at least one of a load of the second power supply, a quality of the input power, or noise associated with the input power.

Example 3 includes the apparatus of example 1, wherein the analytics circuitry is to determine the diagnostic parameter based on sensor data, the diagnostic parameter corresponding to at least one of a humidity metric, a vibration metric, or corrosivity metric of an environment of the second power supply.

Example 4 includes the apparatus of example 1, wherein there is no diagnostic information communicated between the second power supply and the PLC.

Example 5 includes the apparatus of example 1, wherein the analytics circuitry is to estimate a second operating temperature of the second power supply based on a first operating temperature of the first power supply.

Example 6 includes the apparatus of example 1, further including central processing unit (CPU) circuitry to access the diagnostic parameter to predict a remaining useful life of the second power supply based on the diagnostic parameter.

Example 7 includes the apparatus of example 6, wherein the analytics circuitry is to transmit the diagnostic parameter to a field programmable gate array (FPGA) of the PLC without the use of a modem, the CPU circuitry to access the diagnostic parameter from the FPGA.

Example 8 includes the apparatus of example 6, wherein the CPU circuitry is to predict the remaining useful life based on a duration associated with the diagnostic parameter.

Example 9 includes the apparatus of example 1, wherein the diagnostic parameter is a first diagnostic parameter, the analytics circuitry to determine a second diagnostic parameter associated with the first power supply based on internal power of the first power supply.

Example 10 includes an apparatus comprising memory, instructions, and programmable circuitry in a first power supply of a programmable logic controller (PLC), the programmable circuitry to execute the instructions to at least monitor internal power of the first power supply, monitor input power from a second power supply, the second power supply external to the PLC, the second power supply to provide the input power to the first power supply, determine a diagnostic parameter of at least one of the first power supply or the second power supply, and transmit the diagnostic parameter to a field programmable gate array (FPGA) of the PLC.

Example 11 includes the apparatus of example 10, wherein the diagnostic parameter includes at least one of a load of the at least one of the first power supply or the second power supply, a quality of the input power, noise associated with the input power, a humidity metric, a vibration metric, a corrosivity metric, or an operating temperature.

Example 12 includes the apparatus of example 10, wherein there is no diagnostic information communicated between the second power supply and the PLC.

Example 13 includes the apparatus of example 10, wherein the programmable circuitry is to estimate a second operating temperature of the second power supply based on a first operating temperature of the first power supply.

Example 14 includes the apparatus of example 10, further including central processing unit (CPU) circuitry included in the PLC, the CPU circuitry to access the diagnostic parameter from the FPGA, and predict a remaining useful life of the at least one of the first power supply or the second power supply based on the diagnostic parameter.

Example 15 includes the apparatus of example 14, wherein the CPU circuitry is to predict the remaining useful life based on a duration associated with the diagnostic parameter.

Example 16 includes a non-transitory computer readable medium comprising instructions to cause programmable circuitry to at least monitor input power from a second power supply to a first power supply, the first power supply included in a programmable logic controller (PLC), the programmable circuitry included in the first power supply, the second power supply external to the PLC, and determine a diagnostic parameter of the second power supply based on the input power.

Example 17 includes the non-transitory computer readable medium of example 16, wherein the instructions are to cause the programmable circuitry to transmit the diagnostic parameter to a field programmable gate array (FPGA) of the PLC.

Example 18 includes the non-transitory computer readable medium of example 17, wherein the instructions are to cause the programmable circuitry to transmit the diagnostic parameter to the FPGA without the use of a modem.

Example 19 includes the non-transitory computer readable medium of example 16, wherein the diagnostic parameter includes at least one of a load of the second power supply or a quality of the input power.

Example 20 includes the non-transitory computer readable medium of example 16, wherein the diagnostic parameter is a first diagnostic parameter, and the instructions are to cause the programmable circuitry to determine a second diagnostic parameter associated with the first power supply based on internal power of the first power supply.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
second semiconductor based power supply circuitry included in a programmable logic controller (PLC), the second semiconductor based power supply circuitry to receive input power from first semiconductor based power supply circuitry external to the PLC; and
analytics circuitry included in the second semiconductor based power supply circuitry, the analytics circuitry to determine, based on the input power, a diagnostic parameter associated with the first semiconductor based power supply circuitry; and
central processing unit (CPU) circuitry to access the diagnostic parameter to predict a remaining useful life of the first semiconductor based power supply circuitry based on the diagnostic parameter.

2. The apparatus of claim 1, wherein the diagnostic parameter includes at least one of a load of the first semiconductor based power supply circuitry, a quality of the input power, or noise associated with the input power.

3. The apparatus of claim 1, wherein the analytics circuitry is to determine the diagnostic parameter based on sensor data, the diagnostic parameter corresponding to at least one of a humidity metric, a vibration metric, or corrosivity metric of an environment of the first semiconductor based power supply circuitry.

4. The apparatus of claim 1, wherein there is no diagnostic information communicated between the first semiconductor based power supply circuitry and the PLC.

5. The apparatus of claim 1, wherein the analytics circuitry is to estimate a first operating temperature of the first semiconductor based power supply circuitry based on a second operating temperature of the second semiconductor based power supply circuitry.

6. The apparatus of claim 1, wherein the analytics circuitry is to transmit the diagnostic parameter to a field programmable gate array (FPGA) of the PLC without the use of a modem, the CPU circuitry to access the diagnostic parameter from the FPGA.

7. The apparatus of claim 1, wherein the CPU circuitry is to predict the remaining useful life based on a duration associated with the diagnostic parameter.

8. The apparatus of claim 1, wherein the diagnostic parameter is a first diagnostic parameter, the analytics circuitry to determine a second diagnostic parameter associated with the second semiconductor based power supply circuitry based on internal power of the second semiconductor based power supply circuitry.

9. An apparatus comprising:
memory;
instructions;
programmable circuitry in second semiconductor based power supply circuitry of a programmable logic controller (PLC), the programmable circuitry to execute the instructions to at least:
monitor internal power of the second semiconductor based power supply circuitry;
monitor input power from first semiconductor based power supply circuitry, the first semiconductor based power supply circuitry external to the PLC, the first semiconductor based power supply circuitry to provide the input power to the second semiconductor based power supply circuitry;
determine a diagnostic parameter of at least one of the second semiconductor based power supply circuitry or the first semiconductor based power supply circuitry; and transmit the diagnostic parameter to a field programmable gate array (FPGA) of the PLC; and central processing unit (CPU) circuitry in the PLC to:

access the diagnostic parameter from the FPGA; and predict a remaining useful life of the at least one of the first semiconductor based power supply circuitry or the second semiconductor based power supply circuitry based on the diagnostic parameter.

10. The apparatus of claim 9, wherein the diagnostic parameter includes at least one of a load of the at least one of the first semiconductor based power supply circuitry or the second semiconductor based power supply circuitry, a quality of the input power, noise associated with the input power, a humidity metric, a vibration metric, a corrosivity metric, or an operating temperature.

11. The apparatus of claim 9, wherein there is no diagnostic information communicated between the first semiconductor based power supply circuitry and the PLC.

12. The apparatus of claim 9, wherein the programmable circuitry is to estimate a first operating temperature of the first semiconductor based power supply circuitry based on a second operating temperature of the second semiconductor based power supply circuitry.

13. The apparatus of claim 9, wherein the CPU circuitry is to predict the remaining useful life based on a duration associated with the diagnostic parameter.

14. A non-transitory computer readable medium comprising instructions to cause programmable circuitry to at least:

monitor input power from first semiconductor based power supply circuitry to second semiconductor based power supply circuitry, the second semiconductor based power supply circuitry included in a programmable logic controller (PLC), the programmable circuitry included in the second semiconductor based power supply circuitry, the first semiconductor based power supply circuitry external to the PLC; and determine a diagnostic parameter of the first semiconductor based power supply circuitry based on the input power; and predict a remaining useful life of the first semiconductor based power supply circuitry based on the diagnostic parameter.

15. The non-transitory computer readable medium of claim 14, wherein the instructions are to cause the programmable circuitry to transmit the diagnostic parameter to a field programmable gate array (FPGA) of the PLC.

16. The non-transitory computer readable medium of claim 15, wherein the instructions are to cause the programmable circuitry to transmit the diagnostic parameter to the FPGA without the use of a modem.

17. The non-transitory computer readable medium of claim 14, wherein the diagnostic parameter includes at least one of a load of the first semiconductor based power supply circuitry or a quality of the input power.

18. The non-transitory computer readable medium of claim 14, wherein the diagnostic parameter is a first diagnostic parameter, and the instructions are to cause the programmable circuitry to determine a second diagnostic parameter associated with the second semiconductor based power supply circuitry based on internal power of the second semiconductor based power supply circuitry.

* * * * *